United States Patent
Breitman

(10) Patent No.: US 10,963,979 B1
(45) Date of Patent: *Mar. 30, 2021

(54) CONTINUOUS LAUNDRY DRYER VENTILATION MANAGEMENT SYSTEM AND OPERATING METHOD THEREOF

(71) Applicant: Randy Breitman, Princeton, NJ (US)

(72) Inventor: Randy Breitman, Princeton, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/802,257

(22) Filed: Feb. 26, 2020

Related U.S. Application Data

(63) Continuation-in-part of application No. 15/731,460, filed on Jun. 12, 2017, now Pat. No. 10,275,746.

(51) Int. Cl.

| G08B 21/00 | (2006.01) |
|---|---|
| G06Q 50/26 | (2012.01) |
| G06Q 20/40 | (2012.01) |
| G06Q 10/10 | (2012.01) |
| G06Q 10/00 | (2012.01) |
| G06F 16/25 | (2019.01) |
| G06F 16/23 | (2019.01) |
| H04L 29/06 | (2006.01) |
| D06F 58/50 | (2020.01) |
| D06F 34/05 | (2020.01) |
| D06F 34/26 | (2020.01) |
| G05B 15/02 | (2006.01) |
| G06Q 20/10 | (2012.01) |
| D06F 105/58 | (2020.01) |
| D06F 105/30 | (2020.01) |
| D06F 103/30 | (2020.01) |

(52) U.S. Cl.
CPC ............ *G06Q 50/265* (2013.01); *D06F 34/05* (2020.02); *D06F 34/26* (2020.02); *D06F 58/50* (2020.02); *G05B 15/02* (2013.01); *G06F 16/2379* (2019.01); *G06F 16/252* (2019.01); *G06Q 10/10* (2013.01); *G06Q 10/20* (2013.01); *G06Q 20/102* (2013.01); *G06Q 20/409* (2013.01); *H04L 63/08* (2013.01); *D06F 2103/30* (2020.02); *D06F 2105/30* (2020.02); *D06F 2105/58* (2020.02)

(58) Field of Classification Search
CPC .. G06Q 50/265; G06Q 20/102; G06Q 20/409; G06Q 10/20; G06Q 10/10; G06F 16/2379; G06F 16/252; D06F 34/05; D06F 34/26; D06F 58/50; D06F 2105/30; D06F 2103/30; D06F 2105/58; H04L 63/08; G05B 15/02
USPC ........................................................ 340/3.3
See application file for complete search history.

(56) References Cited

U.S. PATENT DOCUMENTS

| 5,860,858 A | 1/1999 | Wettergren |
|---|---|---|
| 7,464,426 B2 | 12/2008 | Lee et al. |
| 8,678,025 B2 | 3/2014 | Kitt |
| 8,955,232 B2 | 2/2015 | Cunningham |

(Continued)

*Primary Examiner* — Mark S Rushing

(57) ABSTRACT

A remote-controlled washer, dryer, laundry product dispenser and payment system and operating method thereof, and is the front-end of the present invention. Said front-end allows the present invention to communicate with each dryer connected to a common vent. Said communication allows the present invention to sense conditions associated with each and every dryer attached to said common vent and control each such dryer. Consequently, the present invention, unlike anything in the prior art, allows an array of said dryers to be remotely controlled by a venting system.

2 Claims, 3 Drawing Sheets

(56) References Cited

U.S. PATENT DOCUMENTS

| | | | |
|---|---|---|---|
| 2008/0127505 A1* | 6/2008 | Han | D06F 58/00 34/72 |
| 2010/0058611 A1* | 3/2010 | Neumann | G01M 99/005 34/487 |
| 2011/0295706 A1* | 12/2011 | Urquhart | G06Q 20/20 705/16 |
| 2012/0218112 A1* | 8/2012 | Kresge | G01L 7/163 340/626 |

* cited by examiner

CONTINUOUS LAUNDRY DRYER VENTILATION MANAGEMENT SYSTEM AND OPERATING METHOD THEREOF

BACKGROUND OF THE INVENTION

Field of the Invention

The present disclosure relates to a clothing drying ventilation system and an operating method thereof enabling remote control of said system for operating clothing drying machines, monitoring said machines from a communication device, as well as collecting and remitting requests for maintenance, repair and emergency requests for help associated with the use of said system.

Background

Most machine clothing drying systems require venting of hot air. Clothing drying ventilation systems are used to complete this task. However, said systems have caused fire damage, fire damage responsibility disputes, maintenance difficulties and compliance issues.

Fire Damage—An analysis of from 2008, Oct. found that 2,900 home clothes dryer fires are reported each year and cause an estimated five deaths, 100 injuries, and $35 million in property loss. It also reported that failure to clean dryers (34 percent) is the leading cause of home clothes dryer fires.

This property and health safety problem is shared by structures which house common area dryer venting in all multifamily, hospitality, laundromat and other types of buildings. Non-residential clothing dryer users typically connect at least two and sometimes dozens of said clothing dryer together by a common venting system. When a fire occurs in said venting system it may damage or destroy vent ducts, vents, dryers, washing machine, property adjacent dryer to the dryers, gas and electric hookups as well the structure housing said venting system. When this occurs electrical power supplies and gas supply valves to all machines are usually turned off, dryer and washer units proximal to venting systems which have caught on fire unplugged with all venting disconnected. Thereafter, the venting ductwork connected to said venting systems which have caught on fire are generally disassembled, usually by the fire department, normally leaving vent pieces were scattered all over the room so as to assess the fire penetration from the venting.

Representative of the owner of the clothing drying ventilation system will investigate the drums of the clothing dryer to determine possible user-based causes of a fire in a clothing drying ventilation system. While more often than not lint in the vents is the cause.

Fire Damage Responsibility—However, lint control responsibility for a clothing drying ventilation system for multiple dryers in a venting system is generally divided. One entity is responsible for the lint control from the clothing dryer through a vent to the common vent and another for the common vent.

Thus, clothing drying ventilation system for multiple dryers normally require a person to check the lint baskets a couple of times during the day. This responsibility is usually set forth in a lease agreement, wherein the maintenance of a clean main vent out of the building is the responsibility of the owner or lessee of the building in which the dryer resides, and the entity which maintains the dryer has the responsibility for lint removal from the dryers through the vent and ending at the point where said vent connects the common vent.

Additionally, users of a clothes dryer also may be responsible for a vent fire. For example, if 1. a vent fire is contained to the drum with some internal wiring melted;
2. the venting system associated with said dryer had a lot of lint in it but shows no fire damage, just lint;
3. the lint basket for said dryer shows a very large amount of dirt, lint and ash; and
4. the clothing from said dryer contains chunks of melted cigarette lighter plastic stuck to clothing and the drum of said dryer, then the vent fire is most likely caused by a user who attempted to dry a cigarette lighter with clothing.

This is not an uncommon problem but finding the clothing dryer user who attempted to dry a cigarette lighter with clothing and thus responsible for the vent fire damage. The present invention assists in the identification process.

Maintenance—According to the largest owner of commercial washer and dryers in the world, the number one complaint of laundry customers is that the dryers "did not dry".

When the technician arrives to diagnose the issue and the machine starts and makes heat, troubleshooting becomes near impossible on the first or subsequent visits. The issue with troubleshooting drying and venting is that a user cannot see inside to detect blockages, and even if one could one could not know what the conditions are inside the entire ventilation system. There is presently no way to get meaningful insights into what the current conditions in the dryer-ventilation system are.

Current systems can aid in the prevention of a fire but they do not give any ability to know when the vents require service and presently pose a potential safety hazard. While other systems wait for an issue to appear, we anticipate issues with machine learning.

Compliance—In addition to preventing vent fires, determining responsibility of vent fires, clothing dryer systems owners face warranty compliance and governmental statutory compliance difficulties. Additionally, compliance with clothes-dryer manufacturers' safety notices must be timely addressed to prevent claims of negligence. Presently there is no system which allows remote integration of current manufacturer specifications and safety notices with the current fire safety statutory specifications simultaneously into a continually monitored dryer ventilation system.

Clothing dryers available to both residential and commercial users are manufactured by a variety of manufacturers. Typically, each of said manufacturer makes numerous types of clothing dryers. Each of said numerous types of clothing dryers has its own set of installation, operating and maintenance instructions which of said instructions in part is related to the safe and efficient use of said clothing dryers.

Due to the unique structure of said numerous types of clothing dryers, said instructions vary from clothing dryer type to clothing dryer type. Additionally, said instruction for said clothing dryer types are usually updated as necessary to alert users to safety issues.

The regulation of the installation, operation and maintenance of said clothing dryers varies from jurisdiction to jurisdiction. Said regulation are particularly concerned with venting said clothing dryers as supported by the fact that said regulations normally, provide written instructions on how to complete the exhaust duct installation in accordance with the provisions of said regulations. For example, 42 FR 54383 paragraphs (a)(1) through (5) of this section. Said state and federal regulations regularly change as evidenced by the fact that 42 FR 54383 was published Oct. 5, 1977, then redesignated at 44 FR 20679 on Apr. 6, 1979 and amended at 58 FR 55018 on Oct. 25, 1993.

Economics—From an economic perspective, it should be noted that lint build up within the ducts adds progressively more resistance in the air flow and creates a potential fire hazard. Additionally, this leads to increased dryer running time due to prolong dryer times with causing 50% more time wasted by dryer users.

In sum, a need exists for a clothing drying ventilation management system and maintenance dispatch capable of remotely assessing and implementing adjustments in the air flow of said system due to changes in: 1. vent air conditions; 2. governmental requirements; 3. manufactures notices while memorializing information suitable for maintenance trouble shooting and supporting legal liability claims while permitting more economical operation. The present invention discloses a device and a method of using said device to address those needs.

SUMMARY OF THE PRESENT INVENTION

The present invention discloses a clothing drying ventilation system comprising a computer, at least one vent sensor, a vent sensor to computer communication system, at least one remote communication device, at least one vent booster fan, a computer to vent booster fan communication system, a dryer/vent control system and a computer to dryer communication system. The present invention also discloses a method of use of said clothing drying ventilation system including: programing of said computer, installing said at least one in vents, installing vent sensor to computer communication system; installing a two way communication system between said compute and at least one remote communication device, installing a computer to dryer communication system.

The present invention's computer is programed to determine the clothing drying ventilation structural requirements by integrating the requirements set forth for each dryer attached to a common venting system. Said ventilation structural requirements are determined by entering the governmental and manufacturing rules and regulations (and change thereof) for each separate dryer attached to a common venting system (and updated as dryers are connected and disconnected from said common venting system) on a continual basis.

More specifically, both clothing dryer manufacturers and/or various state and federal governmental entities have promulgated requirements (sometimes called vent quality characterizes) for each dryer attached to a common venting system and limitation of related to humidity, particulate matter, temperature, air flow direction, pressure, voltage, vibration, oxygen level, carbon monoxide level and carbon dioxide level for both each dryer and for the common vent line (i.e. the vent duct to which each dryer's individual vent line is connected).

The computer is programed to query each of the dryers attached to the common vent line to determine the identity of each dryer and if said each of said dryers is in use. Using this information and a look up table which the computer computes a load value for each promulgated requirement.

For each example, if dryers A, B, C and D are attached to a common venting system and only dryers A and B are in used. A load value of each of the loads noted above (humidity, particulate matter, temperature, air flow direction, pressure, current, vibration, oxygen level, carbon monoxide level and carbon dioxide level) is calculated. For example, the airflow pressure level load would be calculated by adding the carbon monoxide level load of dryer A from said look up table to the airflow pressure level of dryer B from said look up table.

The determination of which dryers are operational would be determined by a computer to dryer communication system. An example, of a dryer/vent control system is disclosed by U.S. Ser. No. 15/731,460 filed Jun. 17, 2017 (12 Jun., 2017). It should be noted that said patent also discloses which user used which dryer at what time. Thus, if a vent fire is traced back to a particular, dryer at a particular time and if said dryer contained chunks of melted cigarette lighter plastic stuck to clothing and the drum of said dryer, then the information U.S. Ser. No. 15/731,460 filed Jun. 17, 2017 (12 Jun., 2017) combined with the information from the present invention could be used to show that vent fire is most likely caused by a specific user who likely attempted to dry a cigarette light with clothing.

The present invention would update the various load on a continuous basis. These load value would be compared to the load values limit set forth in a manufacturer and governmental load level table. Said manufacturer and governmental load level table would be initialized with the dryer manufactures' recommendations and the appropriate governmental requirements and then update based on subsequent notice from the dryer manufacturers and changes in governmental rules and regulation.

A required vent air flow pressure is calculated based on the combining information related to the loads computed by the number and type of dryers working simultaneously and load limits suggested by the manufacturer and governmental load level table for said number and type of dryers working simultaneously for each vent quality characteristic. Once a required vent air flow pressure for each vent quality characteristic is calculated, the highest vent air flow pressure is identified as the recommended vent air flow pressure.

The process of selecting a recommended vent air flow pressure is a continuous process and is communicated to the computer which compares it the actual vent air flow pressure. The computer signals at least one booster fan via said computer to vent booster fan communication system to increase or decrease speed to match the actual vent air flow pressure with the recommended vent air flow pressure.

This process allows the present invention to implement the recommend (by the dryer manufacturer) and requirement (by governmental entities) on a continuous basis. This will better ensure the dryers will be operated properly. This aspect of the current invention will enable operators to validate that the dryers are able to operate at both the manufacturer and fire safety statutory levels at all times. This aspect of the present invention may be further enhanced by the ability to update software as requirements and regulations change.

The computer is programed to record changes recommended vent air flow pressure. This will allow the user of the present invention the ability to estimate the values of recommended vent air flow pressures at different locations in the ventilation system and then to adjust the non-booster (fix speed fans associated with the common venting structure) fan settings to improve efficiency and generate target rules for new facilities.

The present invention includes sensors for said vent quality characteristics. These sensors provide the user of the present inventions with feedback suitable for applications within buildings.

For example, the International Residential Code (IRC) Section M1502 Clothes Dryer Exhaust guidelines states that a dryer exhaust duct should not exceed 25 feet from the dryer to the exhaust vent in the roof or exterior wall. The issue is this guideline expects there to be a straight line without any bends within the venting because for every 45-degree bend, you must deduct 2.5 feet from the total length. Also, for every 90-degree bend, you must deduct 5 feet.

When you want to vent a dryer more than 25 feet you must install a booster fan on the line to maintain an airflow that keeps lint suspended while exhausting to the outside. These booster fans ensure dryer exhaust in the vent line actually makes it to exhaust vent. Presently an automatic pressure switch starts the fan up when it detects the dryer is running, with our system we are validating machine size and performance and adjusting fan speeds to ensure that all monitored ventilation systems are always operating properly.

The present invention uses sensors to monitor said vent quality characteristics (i.e., humidity, particulate matter, temperature, air flow direction, pressure, voltage, vibration, oxygen level, natural gas, propane, carbon monoxide level and carbon dioxide level). This enable vent status detections; including:
1. Detects if vents are operating at their targeted values;
2. Certifies/Validates existing installed vents are operating safely and as designed;
3. Detects if a dryer (or number of dryers) is running to determine to operate the fan and at what speed;
4. Detects ventilation in line blockages;
5. High temperature detected; and
6. Detect target maintenance schedule based upon usage.

As fire safety laws change and monitoring becomes required, the present invention is able to provide the data on the dryer vents available to the local fire marshal. So when a user goes into the building, the user knows that the vents are being taken care of or whether a fire hazard exists. Presently some municipalities request letters that vents have been cleaned are required to be sent, but this letter relies on the fact that someone actually did the work properly versus a fully monitored system.

Prior Art

The prior art, such as Cunningham (U.S. Ser. No. 12/457,980) discloses:

Prior art which continuously automatically monitor operation of a static (fixed number of dryers) clothing dryer venting system while the present invention continuously automatically monitor operation of a dynamic (variable and changing number of dryers) clothing dryer venting system;

Prior art which continuously automatically determining vent pressure and if said vent pressure is outside of a set (static) range, then the clothing dryer and the venting system is automatically disabled, while the present invention continuously automatically determining vent pressure and if said vent pressure is outside a dynamic range determined by the number of operating dryers, continuously automatically determines a vent pressure, then then dryer and the venting system is automatically disabled, Prior art which, if the clothing dryer starts running then automatically turning on a booster fan and the operation of said booster fan is monitored by sensing the current drawn, while the present invention turns on or off booster fan(s) base on governmental air flow regulation and clothing dryer manufacturer's recommendation; and Prior art which discloses, that the monitoring operation of the venting system through a first controller and automatically disabling the dryer through a second controller (i.e., automatically turn off the booster fan if the dryer is not running and automatically adjust operating parameters of the clothing dryer venting system in an attempt to operate the venting system properly as well as disabling the clothing dryer if the venting system continues to operate improperly after adjustment and checking to determine if the dryer is drawing current to indicate the dryer is running, which the present invention is capable of performing these operation (and more), it uses one computer rather than two controllers.

BRIEF DESCRIPTION OF THE DRAWINGS

The accompanying drawings, which are included to provide a further understanding of the invention and are incorporated in and constitute a part of this specification illustrate embodiments of the invention and together with the description serve to explain the principles of the invention. In the drawings.

DETAILED SPECIFICATION AND METHOD OF USE

The present invention incorporates the element of a prior invention, namely, the remote-controlled washer, dryer, laundry product dispenser and payment system and operating method thereof U.S. Ser. No. 15/731,460 filed Jun. 17, 2017 (12 Jun., 2017) and adds a vent management system to it.

More specifically, the present disclosure relates to a venting management system which is integrated into the clothing laundry system and a control method thereof previously disclosed in '460 and at least one vent sensor, at least one vent booster fan and a vent control computer enabling a continuous laundry dryer ventilation management system and operating method thereof. The present invention is a continuation-in-part of U.S. application Ser. No. 15/731,460 which converts a standard dryer into a smart dryer. More specifically, the '460 is a remote-controlled washer, dryer, laundry product dispenser and payment system and operating method thereof, and is the front-end of the present invention. Said front-end allows the present invention to communicate with each dryer connected to a common vent. Said communication allows the present invention to sense conditions associated with each and every dryer attached to said common vent 10100 and control each such dryer. Consequently, the present invention, unlike anything in the prior art, allows an array of said dryers to be remotely controlled by a venting system.

Figure 3:
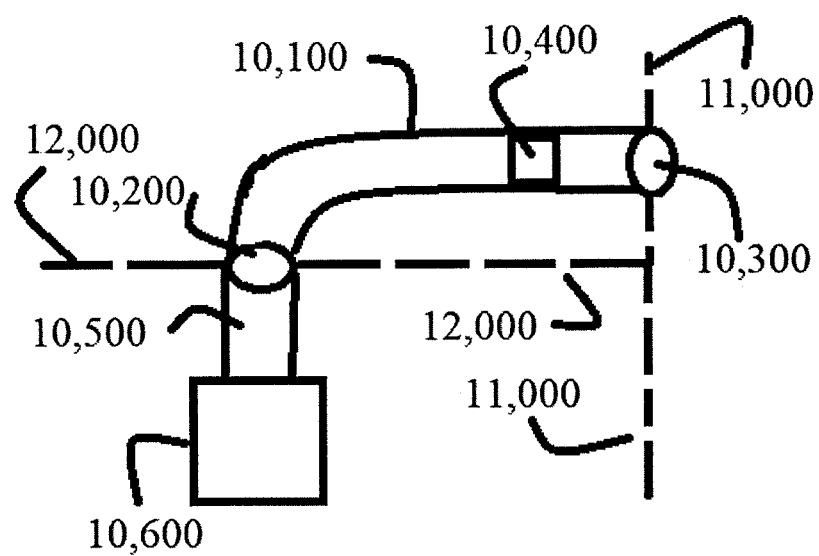
FIG. 3 illustrates schematically a block diagram of a typical arrangements of physical elements of a laundry installation according to the present invention.

As depicted in FIG. 3, in a preferred embodiment at least two sensor clusters 10200, 10300 are integrated into the common vent 10100. Typically, common vent 10100 passes through ceiling 12000 though an interior space to exit through exterior wall 11000 such that effluent or exhaust air is discharged outdoors. In a preferred embodiment, each of at least two sensor clusters 10200, 10300 are disposed at each end, proximal or inside end of common vent duct 10100, and distal end of the common vent duct 10100. In a preferred embodiment, the proximal end of said common vent duct 10100 is attached to dryer 10600 at connector 10500. Each sensor cluster has remote communication capability enabling each sensor in said sensor cluster to communicate with vent control computer 2000. at least one sensor 3000 to detect such conditions as humidity, particulate matter, temperature, air flow direction, pressure, current, vibration, oxygen level, natural gas, propane, carbon monoxide level and carbon dioxide level.

In an embodiment having a single booster fan 10400 and sensor cluster 10300, said sensor cluster is disposed proximal but close to said at least one sensor cluster 10300. In an embodiment having a single sensor cluster 10200 or 10300, the pressure sensor should be as close to the proximal end 10300 of the common vent 10100 as possible to avoid distorted pressure measurements by booster fan 10400.

Figure 1:
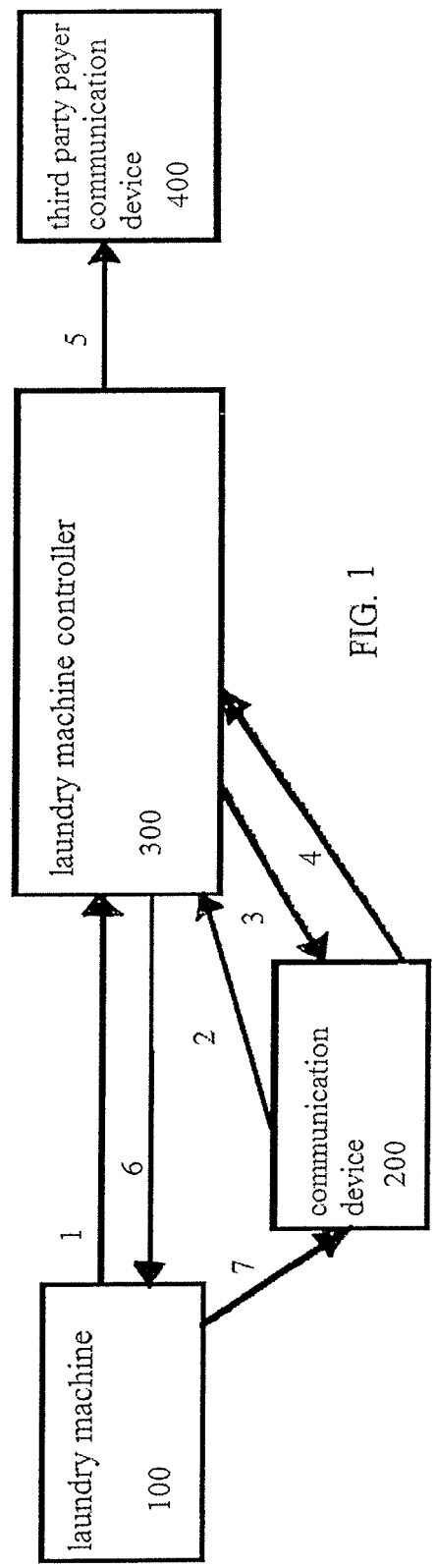
FIG. 1 illustrates schematically a block diagram of the elements according to the laundry system element of present invention

Referring to FIG. 1 the laundry system element of present invention is composed of five elements, including a communication device 200, a laundry machine controller 300, a laundry machine controller connector (not shown) to a laundry machine 100 and a third-party payer communication device 400. Said communication device 200, such as a smart phone is capable of sending at least two messages to and receiving at least one message from said laundry machine controller 300. The laundry-machine controller connector is required for the present invention. Said connector can be incorporated by the manufacturer or an existing cable. Alternatively, the connector may be a wireless communications element such as a chip in lieu of a cable (e.g., via Wi-Fi or Bluetooth). Said connector must be capable of transmitting laundry-machine 100 data to laundry-machine controller 300 in such a format as to allow laundry-machine controller 300 to read it.

The specifications of the connector are protocol-specific to a manufacturer or even by model by the same manufacturer. Acquiring said protocols may be achieved by working directly with manufacturers of new equipment or reprogramming laundry machine 100 to use protocols usable by laundry-machine controller 300

Said laundry machine controller 300 is capable of receiving at least two messages from said communication device 200, sending at least one message to said communication device 200, receiving at least one message from a laundry machine 100, using said message to update a log of said laundry machine 100 use history; sending at least one message to said laundry machine 100, and sending a message to a third party willing to transfer funds on behalf of the user of said communication device 200. Said laundry machine 100 is capable of sending a message to said laundry machine controller 300 and of receiving a message from said laundry machine controller 300.

Said third party payer communication device 400 is capable of receiving at least one message from said laundry machine controller 300.

The laundry system element of the present invention uses a set of cables which are uniquely associated with the laundry machine 100 as needed due to laundry machine 100 specifications by manufacturer. The present invention may push updates to software or firmware in either laundry machine 100 or laundry machine controller 300 over-the-air using Wi-Fi, Bluetooth, Z-wave or other communications protocols.

Figure 2:
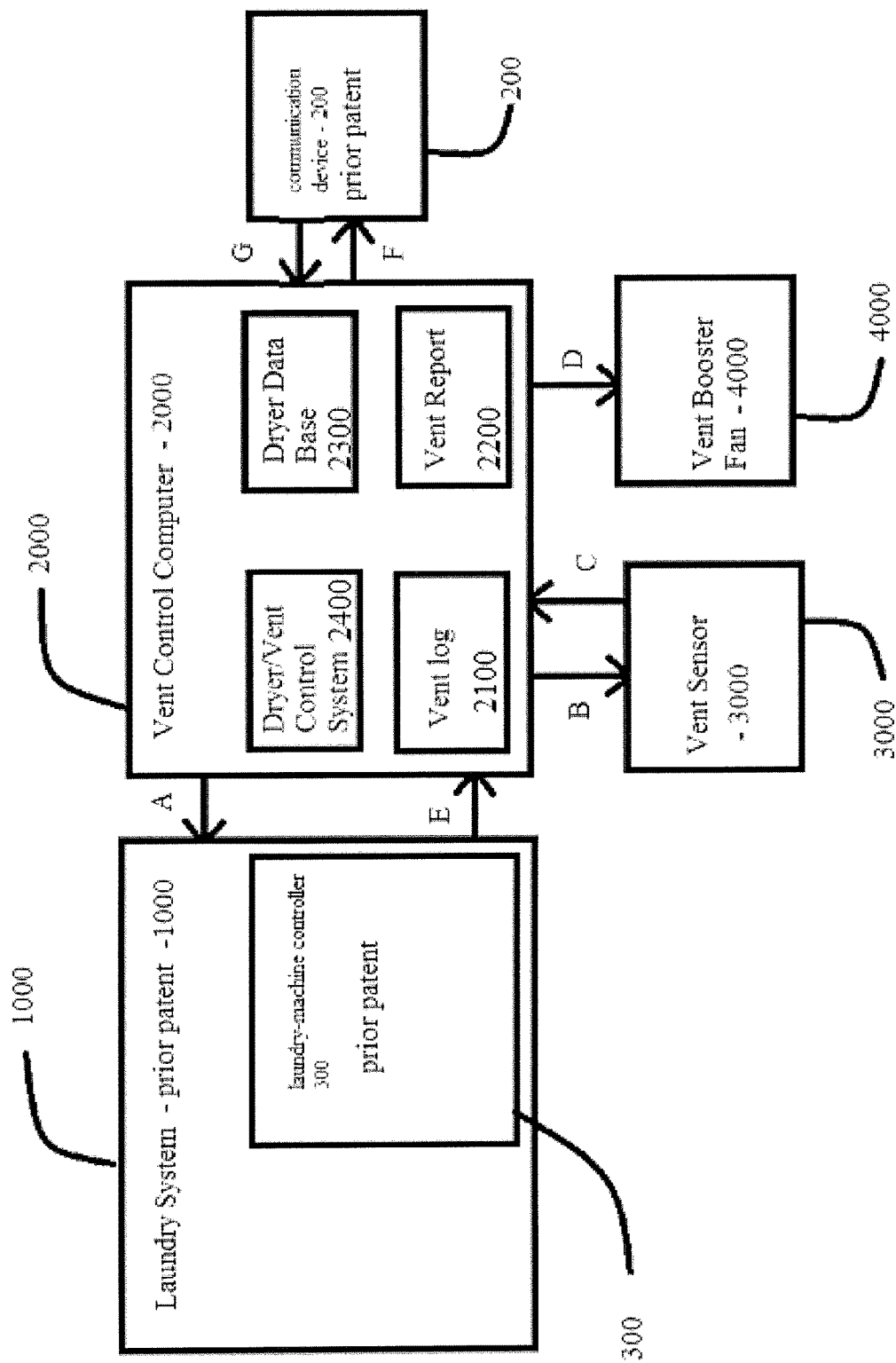
FIG. 2 illustrates schematically a block diagram showing the interrelation of various device elements according to present invention.

The method of use of said laundry system element is disclosed in U.S. patent application Ser. No. 15/731,460 and is hereby incorporated herein. Referring to FIG. 2 the present invention is composed of four main elements, including: a laundry system element (1000), a vent control computer (2000), at least one vent sensor (3000) and at least one vent booster fan (4000). As depicted residing within vent control computer (2000), disclosed components are a vent log 2100, vent report 2200, vent dryer database 2300, and dryer/vent control system 2400 interacting to achieve the control desired by the users of the current invention.

Each of the foregoing are software programs: vent log 2100 is capable of receiving input from external sources such as laundry system 1000, vent sensors 3000, and vent booster fan 4000, and is capable of communicating outside the system via communications software located in vent control computer 2000 (not shown) as well as internal software systems such as vent log 2100, vent report 2200, vent dryer database 2300, and dryer/vent control system 2400, for purposes of updating execution and database software in vent control computer 2000.

Vent report software 2200 is structured to communicate with vent log 2100 and compiling reports to be communicated to communication device 200 and dryer/vent control system 2400. It should be noted that all communication to and from the vent control compute is structured to be performed by a communication software (not shown). Said communication software is structured to send and receive communication s to devices external to vent control computer 2000, and route messages to appropriate software residing in vent control computer 2000, such as vent log 2100, vent report 2200, vent dryer database 2300, and dryer/vent control system 2400.

Dryer database 2300 is designed to accept input from communication device 200, to store operating characteristic with each dryer 10600, which is attached to common vent 10100. Said database 2300 is accessible by all other software residing in vent control computer 2000, such as vent report 2200, and dryer/vent control system 2400.

Dryer/vent control system 2400 communicates with external devices, including a laundry system element (1000), a vent control computer (2000), at least one vent sensor (3000) and at least one vent booster fan (4000) via communication software (not shown). Said dryer/vent control system 2400, using inputs stored in vent log 2100, and dryer database content 2300, queries protocols to adjust the speed of booster fan 4000, query vent sensor 3000, and turn on or off dryers 10600 via signals through vent control computer 2000 communications system (not shown) to laundry system 1000, which is structured to activate or deactivate dryers 10600. The instructions initiated by dryer/vent control system 2400 are logged in vent log 2100, which are processed by vent report 2200, and communicated to communication device 200 via vent control computer communications system (not shown). It should be noted that communication device 200 is programmed to automatically phone fire or police when sensor 3000 detects dangerously high levels of temperature, pressure, carbon monoxide or dioxide. Said dangerous levels are resident in the dryer database 2300 and are set by communication device 200 based upon governmental and dryer-manufacturers' recommendations.

More particularly, the method of the present invention may be practiced by following the steps of:
1) activating said laundry system by
   (a) sending a message one from said laundry machine to said laundry machine controller, said message one communicates the operational status of said laundry machine;

(b) updating a log associated with said laundry machine, said log located in laundry machine controller upon receipt of said message one;
(c) creating a report associated with said log's update upon the execution of said update;
(d) communicating said report to an operator of said laundry machine controller;
(e) sending a message two from a communication device, to said control laundry machine controller, whereby said message two communicates said communication device's user name and a funds transfer authorization, such as a credit card authorization benefiting an operator of said laundry machine controller;
(f) building a user log in said laundry machine controller upon receipt of said message two containing information from said message two;
(g) generating a user id and a user password associated with said user log upon said generation;
(h) adding said user id and said password to said user log;
(i) sending a message three from said laundry machine controller to said communication device whereby said communication device stores said password and said user id;
(j) sending a message four from communication device to said laundry machine controller communicating the identity of said laundry machine and authorization for said operator of laundry machine controller to transfer funds;
(k) sending a message five from said laundry machine controller to a third-party communicating request for payment of funds to said operator of said laundry machine controller;
(l) sending a message six from said laundry machine controller to said identified laundry machine communicating authorization to operate;
(m) signaling a message seven from said laundry machine to operator of said communication device communicating authorization to operate said laundry machine;
2) activating said venting management system by
(a) sending a message A to said vent control computer from said laundry machine controller, said message A communicates the operational status of said laundry machine;
(b) sending a message B to said at least one vent sensor from said vent control computer; said message B requests vent status information;
(c) sending a message C to said vent control computer from said at least one vent sensor, said message C communicates said requested information,
wherein said requested information includes status of the air proximal to said at least one vent sensor, including humidity, particulate matter, temperature, air flow direction, pressure, vibration, oxygen level, carbon monoxide level and carbon dioxide level, and
wherein said requested information derives from
at least one vent sensor;
a vent sensor to computer communication system;
at least one remote communication device;
at least one vent booster fan;
a computer to vent booster fan communication system;
a dryer/vent control system; and
a computer to dryer communication system.

d) updating a vent log associated with said laundry machine, said log located in said vent control computer upon receipt of said messages A and C;
e) using said dryer/vent control system located in said vent control computer to calculate vent load by integrating said vent log information concerning the number and type of clothing dryers operating simultaneously with said dryer data base;
f) sending message D to at least one vent booster fan from said vent computer, said message D communicates an amount of air pressure to be produced by said at least one vent booster fan, such that said amount of air pressure to be produced by said at least one vent booster fan is equal to or greater than said vent load as calculated by said dryer/vent control system;
g) sending message E to said laundry machine controller to said dryer from said vent control computer, said message E communicates a message to turn off said dryer if said dryer/vent control system determines that said vent pressure communicated by said at least one sensor is less than equal said vent load as calculated by said dryer/vent control system;
h) creating a report associated with said vent log's update upon the execution of said update; and
i) communicating said report to said communication device said vent control computer via message F
wherein said communication device is capable of remotely controlling said vent control computer via a plurality of messages G.

Although the invention has been described with reference to particular embodiments and methods, this description is not meant to be construed in a limiting sense. Various modifications and alterations of the disclosed embodiments as well as alternative methods of the invention will become apparent to persons skilled in the art. It is therefore contemplated that the appended claims cover any such alternatives, embodiments, modifications, methods, and variations that fall within the scope of the invention.

I claim:
1. A method for using a continuous laundry dryer ventilation management system according to the following steps:
A) providing a laundry system and a venting management system;
wherein said laundry system comprises:
at least one laundry machine;
a communication device;
a laundry machine controller;
a third-party payer communication device; and
a laundry-machine controller connector;
wherein said venting management system comprising:
a vent control computer
wherein said vent control computer contains
a vent log;
a vent report application;
a dryer database containing a vent pressure load for said at least one laundry machine attached to said continuous laundry dryer ventilation management system; and
a dryer/vent control system
at least one vent sensor;
at least one remote communication device; and
at least one vent booster fan
B) activating said laundry system by
a) sending a message one from said at least one laundry machine to said laundry machine controller, said message one communicates the operational status of said at least one laundry machine;
b) updating a log associated with said at least one laundry machine, said log located in said laundry machine controller upon receipt of said message one;
c) creating a report associated with said log's update upon the execution of said update;
d) communicating said report to an operator of said laundry machine controller;
e) sending a message two from a communication device, to said laundry machine controller, whereby said message two identifies said communication device and communicates a funds transfer authorization benefiting an operator of said laundry machine controller;
f) building a user log in said laundry machine controller upon receipt of said message two containing information from said message two;
g) generating a user id and a user password associated with said user log upon said generation;
h) adding said user id and said user password to said user log;
i) sending a message three from said laundry machine controller to said communication device whereby said communication device stores said user password and said user id;
j) sending a message four from said communication device to said laundry machine controller identifying said at least one laundry machine and communicates said funds transfer authorization for said operator of said laundry machine controller to transfer funds;
k) sending a message five from said laundry machine controller to a third-partycommunicating request for payment of funds to said operator of said laundry machine controller;
l) sending a message six from said laundry machine controller to said identified at least one laundry machine communicating authorization to operate;
m) signaling a message seven from said at least one laundry machine to operator of said communication device communicating authorization to operate said at least one laundry machine;
C) activating said venting management system by
a) sending a message A to said vent control computer from said laundry machine controller, said message A communicates the operational status of said at least one laundry machine;
b) sending a message B to said at least one vent sensor from said vent control computer; said message B requests vent status information;
c) sending a message C to said vent control computer from said at least one vent sensor, said message C communicates said requested vent status information,
wherein said requested vent status information includes a reading of air proximal to said at least one vent sensor, comprising at least one of humidity, particulate matter, temperature, air flow direction, pressure, vibration, oxygen level, carbon monoxide level and carbon dioxide level, and
wherein said requested vent status information derives from said at least one vent sensor;
a vent sensor to computer communication system;
at least one remote communication device;
at least one vent booster fan;
a computer to vent booster fan communication system;
a dryer/vent control system; and
a computer to dryer communication system;
d) updating said vent log associated with said at least one laundry machine, said vent log located in said vent control computer upon receipt of said messages A and C;
e) using said dryer/vent control system located in said vent control computer to calculate a vent load value from said vent log for each said at least one laundry machine operating simultaneously and a lookup table in said dryer data base;
f) sending a message D to at least one vent booster fan from said vent control computer, said message D communicates an amount of air pressure to be produced by said at least one vent booster fan, such that said amount of air pressure to be produced by said at least one vent booster fan is equal to or greater than said vent load as calculated by said dryer/vent control system;
g) sending a message E to said laundry machine controller to said at least one laundry machine from said vent control computer, said message E communicates a message to turn off said at least one laundry machine if said dryer/vent control system determines that said vent pressure communicated by said at least one sensor is less than equal said vent load as calculated by said dryer/vent control system;
h) creating a report associated with said vent log's update upon the execution of said update;
i) communicating said report to said communication device and said vent control computer via message F, wherein said communication device is capable of remotely controlling said vent control computer via a plurality of messages G.

2. The method of claim 1, wherein said report is communicated directly to a local fire department and local police department.

* * * * *